United States Patent [19]

Burckhardt et al.

[11] Patent Number: 4,940,293

[45] Date of Patent: Jul. 10, 1990

[54] DRIVE SLIP CONTROL DEVICE

[75] Inventors: Manfred Burckhardt, Wailblingen; Andreas Faulhaber, Weinstadt; Franz Brugger, Winnenden, all of Fed. Rep. of Germany

[73] Assignee: Daimler-Benz AG, Fed. Rep. of Germany

[21] Appl. No.: 301,960

[22] Filed: Jan. 26, 1989

[30] Foreign Application Priority Data

Jan. 26, 1989 [DE] Fed. Rep. of Germany ....... 3802133

[51] Int. Cl.⁵ .............................................. B60T 8/64
[52] U.S. Cl. .................................... 303/110; 180/197; 303/116
[58] Field of Search .................. 303/95, 96, 98, 100, 303/106, 108, 109, 110, 113, 114, 116, 119; 188/181 R, 181 A, 181 C; 180/197; 364/426.03

[56] References Cited

U.S. PATENT DOCUMENTS

| | | | |
|---|---|---|---|
| 4,480,309 | 10/1984 | Burckhardt et al. | 303/96 X |
| 4,509,802 | 4/1985 | Solleder et al. | 180/197 X |
| 4,681,373 | 7/1987 | Nomura et al. | 303/96 X |
| 4,726,630 | 2/1988 | Krohn et al. | 303/119 |
| 4,746,174 | 5/1988 | Buschmann | 303/119 |
| 4,778,225 | 10/1988 | Rudolph et al. | 303/114 |
| 4,786,118 | 11/1988 | Burgdorf et al. | 303/110 |
| 4,864,532 | 7/1989 | Friedou et al. | 303/110 |

FOREIGN PATENT DOCUMENTS

| | | | |
|---|---|---|---|
| 0233499 | 8/1987 | European Pat. Off. | 303/110 |
| 1806671 | 4/1973 | Fed. Rep. of Germany . | |
| 3119803 | 12/1982 | Fed. Rep. of Germany | 303/110 |
| 3137287 | 1/1984 | Fed. Rep. of Germany . | |
| 3506853 | 2/1987 | Fed. Rep. of Germany . | |
| 3621000 | 1/1988 | Fed. Rep. of Germany . | |
| 85752 | 4/1987 | Japan | 303/109 |
| 2078323 | 1/1982 | United Kingdom | 180/197 |

Primary Examiner—Duane A. Reger
Attorney, Agent, or Firm—Evenson, Wands, Edwards, Lenahan & McKeown

[57] ABSTRACT

In a drive slip control device for a road vehicle, which is provided with an anti-lock system operating on the pump-back principle and having a return pump of the anti-lock system associated with the brake circuit of the driven vehicle wheels used as the auxiliary pressure source for the drive slip control, for braking a vehicle wheel tending to spin. When the drive slip control is activated, the main brake pipe of the brake circuit of the driven vehicle wheels is shut off from the brake unit by means of a drive slip control valve. The return pump is activated and is shut off from the brake unit until the drive slip of one of the driven vehicle wheels exceeds a threshold value whose magnitude lies between the drive slip required value and threshold response value. The brake pressure control valves of the brake circuit of the driven vehicle wheels are driven into their closed position by means of this anticipatory activation of the return pump. This causes high pressure to build up in the main brake pipe, which is limited to a value of the anti-lock braking system and of the brake equipment by means of a pressure limiting valve, which is then available for an introductory brake pressure build-up phase of the drive slip control on the vehicle wheel requiring it. An additional outlet valve, by means of which the return line of the rear axle of the anti-lock system can be directly connected to the brake fluid reservoir, can be provided for controlling the pressure reduction phases.

20 Claims, 1 Drawing Sheet

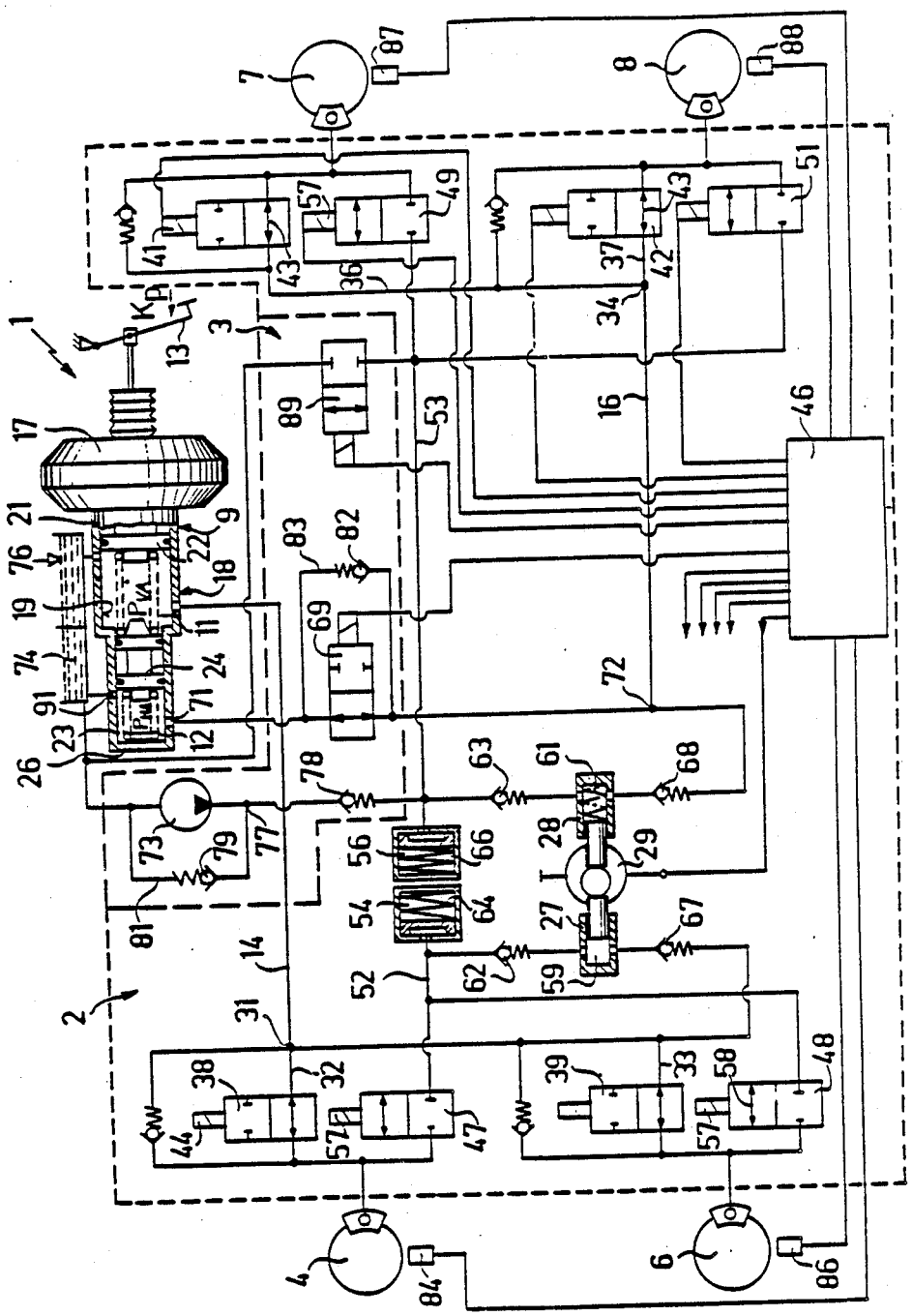

DRIVE SLIP CONTROL DEVICE

BACKGROUND AND SUMMARY OF THE INVENTION

The invention concerns a drive slip control device for a road vehicle having a twin-circuit hydraulic brake installation with front axle/rear axle brake circuit subdivisions wherein one of the brake circuits' subdivision is associated with the non-driven vehicle wheels and the other is associated with the driven vehicle wheels, and both are designed as static brake circuits whose brake pressure supply is achieved by providing a brake device having two outlet pressure spaces, one associated with each brake circuit. The vehicle is equipped with an anti-lock system operating on the pump-back principle and includes brake pressure control valves associated individually with each of the driven and non-driven vehicle wheels, and two return pumps associated one each with the two brake circuits' subdivisions for returning brake fluid is during pressure reduction phases of the anti-lock control, out of the wheel brake(s) currently subjected to the control system into the brake device output pressure space associated with the particular brake circuit. The return pump of the brake circuit of the driven vehicle wheels is used as the pressure source in the brake pressure build-up phases of the driven slip control and a drive slip control valve is provided for control process connection of the return pump to the brake circuit of the driven vehicle wheels. The drive slip control valve is driven by a drive slip control signal from an electronic control unit controlling the control phases of the drive slip control from a basic position associated with the normal brake operation and anti-lock control operation, in which position the output pressure space of the brake device associated with the brake circuit of the driven vehicle wheels is connected to the main brake pipe of the brake circuit, and into an excited functional position in which this output pressure space is shut off from the main brake pipe while the main brake pipe continues to be connected to the pressure output of the associated return pump. Pressure can be connected to the brake circuit of the driven vehicle wheels by means of the return pump as controlled by a brake pressure build-up control signal from the electronic control unit and a pressure limiting valve is provided to limit the pressure connected to the brake circuit of the driven vehicle wheels during drive slip control operation, by means of which brake fluid can flow out of the brake circuit of the driven vehicle wheels to the brake fluid reservoir of the brake installation when the output pressure of the return pump exceeds a specified threshold value.

A drive slip control device combined with an anti-lock system is known from DE-OS 31 37 287 C2, and comprises a rather complicated structure. An interesting possibility considered for simplifying this known drive slip control device wherein the return pump of the anti-lock system was already used as the reservoir charging pump for the pressure reservoir provided as the auxiliary pressure source within the drive slip control device was to avoid the use of this pressure reservoir and, in its place, to use the return pump associated with the brake circuit of the driven vehicle wheels directly as the auxiliary pressure source for the drive slip control device.

The test drive slip control device designed in accordance with this concept was laid out for a vehicle with a rear axle drive and the anti-lock system of the vehicle corresponding to the series production type, i.e., the design of the return pumps provided for the two brake circuits involved piston pumps which were not self-priming. In order to ensure the functioning of the return pump associated with the rear axle brake circuit as a pressure source in drive slip control operation, the vehicle was equipped with a booster pump by means of which brake fluid was pumped out of the brake fluid reservoir of the brake installation into the pump chamber of the return pump associated with the rear axle brake circuit in drive-slip control operation. The control behavior achieved in this test-type drive slip control operation, however, was unsatisfactory in that the control was very sluggish, i.e., the build-up of brake pressure occurred relatively slowly after the booster Pump and the return pump had been switched on. In order to achieve a response behavior which was at least approximately comparable with conventional drive slip control, it therefore appeared unavoidable to provide a return pump with a larger pumping capacity, at least for the brake circuit of the driven vehicle wheels. There are, however, design limits to such an increase in size so that, for this reason alone, it did not always appear possible to achieve a sufficiently rapid response behavior of the control system, particularly since the return pump of the conventional anti-lock system did not appear to be a suitable auxiliary pressure source for drive slip control.

On this basis therefore, the object of the invention is to produce a drive slip control device of the type mentioned at the beginning, which responds sufficiently rapidly even if a return pump of conventional type is used as the auxiliary pressure source.

The invention achieves this object by having the electronic control unit generate an output signal for driving the drive slip control valve into its excited shut-off position and an output signal causing the activation of the return pump of the brake circuit of the driven vehicle wheels and output signals by means of which the brake pressure control valves and of the wheel brakes and of the driven vehicle wheels are driven into their shut-off position as soon as the drive slip of at least one of the driven vehicle wheels reaches or exceeds a specified threshold value whose magnitude is between the required slip value and the response threshold value of the drive slip control.

Accordingly, this return pump, including a booster pump provided in association with the return pump, is activated as soon as a driven vehicle wheel, although it is not yet experiencing an excessive drive slip corresponding to the response threshold value of the drive slip control which demands "countering" by the control system, has reached a value of drive slip of this vehicle wheel which is higher, by a specified amount than the required value specified for the control system, so that it can be anticipated that this vehicle wheel will experience a still higher drive slip in the immediate future and will therefore be subjected to a control cycle. With the activation of the return pump, or slightly delayed relative to this activation, the brake pressure control valves of the driven vehicle wheels are also driven into their closed position and the drive slip control valve is driven into its position shutting off the main brake pipe from the brake device. By this means, a higher pressure is generated in the section of the main brake pipe of the brake circuit of the driven vehicle wheels branching towards the wheel brakes and this pressure can be connected to the wheel brake immediately when control on the vehicle wheel considered has to become effective, by switching the brake pressure control valve of this wheel into its brake pressure build-up position. The section of the main brake pipe branching off to the wheel brakes and a noise suppressor which is usually connected to it (this noise suppressor being normally provided only to buffer the pressure shocks from the return pump), is then used as a high pressure reservoir. Although the storage capacity of the latter is markedly less than the storage capacity of the pressure reservoir provided as the auxiliary pressure source in a drive slip control device of known type, it still permits the brake pressure build-up phase in the wheel brake of the particular vehicle wheel subjected to the control system. This build-up phase initiates the drive slip control cycle. Although the pressure level is only moderate, there is practically no delay and to this extent the build-up provides a desirably rapid response behavior to the drive slip control procedure during the further course of which the return pump can take over the build-up of the pressure to the necessary brake pressure level.

The control signals necessary for activating the return pump and for switching over the drive slip control valve and the brake pressure control valves are obtained from the electronic control unit of the drive slip control device by processing the output signals of the wheel speed sensors associated with the individual vehicle wheels according to known criteria. The wheel speed sensors generate electrical output signals characteristic of the dynamic behavior of the vehicle wheels in terms of level and/or frequency. These output signals cause the electronic control unit to generate an output signal for controlling the drive slip control valve, an output signal procuring the activation of the return pump and output signals driving the brake pressure control valves into their shut-off position as soon as the wheel peripheral acceleration of at least one of the driven vehicle wheels exceeds a response threshold value and/or is greater than the vehicle acceleration by more than a specified difference which is fixed or varies with vehicle speed.

By having the output signal of the electronic control unit cause the activation of the pump drive of the return pump of the brake circuit of the driven vehicle wheels as soon as the drive slip of least one of the driven vehicle wheels reaches or exceeds a specified threshold value, which is between 50% and 70% of the threshold value at which the drive slip control valve and the brake pressure control valves and of the wheel brakes of the driven vehicle wheels are moved into their shut-off position, and/or when the wheel peripheral acceleration of at least one of the driven vehicle wheels exceeds a response threshold value and/or is greater than the vehicle acceleration by a specified difference which is fixed or varies with the speed of the vehicle has the advantage that any influence of the pump running-up period is, so to speak, eliminated. The circulatory operation introducing a control cycle in this way generates a -dynamic-pressure which, although smaller, is still sufficient to bring the wheel brakes into contact so that when, subsequently, the brake device is shut off from the brake circuit, by driving the drive slip control valve, the wheel brakes respond with practically no delay, thus improving the sensitivity of the control system.

The arrangement of the drive slip control valve wherein the drive slip control valve is designed as a 2/2-way solenoid valve which is connected between the brake device pressure output associated with the brake circuit of the driven vehicle wheels and the section of the main brake pipe branching to the wheel brakes of the driven vehicle wheels and wherein the section of the main brake pipe branching to the wheel brakes of the driven vehicle wheels and a pressure limiting valve are connected in parallel with the drive slip control valve provides a particularly simple structure of the hydraulic unit in terms of switching and control.

Pressure loads on the brake device due to the control system are excluded by means of an additional outlet valve designed as a solenoid valve and provided as a further drive slip functional control valve by means of which the return pipe of the brake circuit of the driven vehicle wheels can be directly connected to the brake fluid reservoirs of the brake installation during the pressure reduction phases of the drive slip control, so that, in combination with the drive slip control device of the invention, a series production, simple design of brake device, e.g. a tandem main cylinder of conventional type, can be used.

The drive slip control device of the invention is achievable at substantially less cost than known equipment of this type and has, in addition, the advantage that the interference noises caused by the operation of individual elements of the control device only appear when the control device is activated in accordance with its purpose but not during normal driving, such as can occur during reservoir recharging phases in a conventional control device.

Other objects, advantages and novel features of the present invention will become apparent from the following detailed description of the invention when considered in conjunction with the accompanying drawings.

BRIEF DESCRIPTION OF THE DRAWING

The drawing shows an electro-hydraulic block circuit diagram of a twin-circuit hydraulic brake installation a road vehicle being equipped with an anti-lock system and also with a system for drive slip control.

DETAILED DESCRIPTION OF THE DRAWINGS

In the brake installation 1, the front wheel brakes 4 and 6 are connected to a front axle brake circuit I and the rear wheel brakes 7 and 8 to a rear axle brake circuit II.

A brake device designated 9 is provided for supplying brake pressure to the two brake circuits I and II. This brake device 9 has two outlet pressure spaces 11 and 12, one allocated to each of the two brake circuits I and II, in which static brake pressures $P_{FA}$ and $P_{RA}$ can be built up, in proportion to the force $K_p$ with which the driver operates a brake pedal 13. These brake pressures $P_{FA}$ and $P_{RA}$ can be connected via the respective main brake pipes 14 or 16 of the front and rear axle brake circuits I and II to their resPective wheel brakes 4/6 or 7/8. A pneumatic or hydraulic brake force amplifier 17 is also provided as part of the brake device as a "braking aid". The amplification factor of this brake device can have a value between 3 and 6.

The brake device 9 is so designed that should the brake force amplifier 17 fail, the brake pressure generating element (stepped tandem main cylinder 18) remains operable by the pedal force $K_p$ alone.

The primary output pressure space 11 of the main cylinder 18 is defined by a fixed boundary of the larger bore step 19 and an axially movable boundary formed by the primary piston 22 displaceable in a pressure tight manner within this larger bore step 19. The secondary output pressure space 12 is defined by a fixed boundary of the smaller bore step 23 and an axially moveable boundary formed by the secondary piston 24, designed as a floating piston of the tandem main cylinder 18, so as to be displaced in a pressure-tight manner in the smaller bore step 23 of the main cylinder casing 21. The secondary piston 24 and has a fixed boundary provided by the end wall 26 of the main cylinder 21.

This main cylinder 18 and its operation are well known in the brake technology and to shorten this patent document are not discussed further. The vehicle (not shown) has a rear axle drive, the output torque of the vehicle engine being distributed to the two rear wheels of the vehicle via a rear axle differential.

The drive slip control 2 operates on the pump-back principle in both the front axle brake circuit I and the rear axle brake circuit II. In brake pressure reduction phases of the anti-lock control, brake fluid is drained from one of the wheel brakes 4 and/or 6 and 7 and/or 8 and is pumped back into the output pressure space 11 or 12 of the main cylinder 18 associated with the particular brake circuit I or II, so that the brake pedal 13 is forced back towards its basic position by a partial stroke correlated with each quantity of brake fluid pumped back. The driver thus receives an obvious feedback on the activation of the drive slip control system 2, this becoming stronger as the magnitude of the pressure reduction in the brake(s) subjected to the control becomes greater.

For each of the two brake circuits, I and II return piston pumps 27 and 28, are provided and have a common electrically driven eccentric pump drive 29. In a typical design of the return pumps 27 and 28, the volume pumped per piston stroke is approximately 0.2 cm$^3$, i.e. approximately twenty piston strokes are necessary to have pump 27 pump back a brake fluid quantity of 4 cm$^3$ into the primary output pressure space 11 of the tandem main cylinder 18, which quantity corresponds approximately to that total quantity of brake fluid which is taken by the brake cylinders of the front wheel brakes 4 and 6 during an operation of the brake installation 1 with maximum operating force, i.e. up to a maximum brake pressure build-up of approximately 180–200 bar. The corresponding brake fluid volume of the rear axle brake circuit II is approximately half of this, i.e., 2 cm$^3$. The consequence of this design of the return pumps 27 and 28 is that the brake pedal 13 is not returned to its basic position in a single steadily proceeding stroke, but, rather operates stepwise. The return of the brake pedal 13 in each of these steps being by a small partial stroke (h). This partial step (h) being given by the relationship $h = V_{RFP}/F_{Pr}$, where $V_{RFP}$ is the volume pumped by the return pump 27 or 28 per piston stroke, and $F_{Pr}$ is the effective cross-sectional area of the primary piston 22 of the tandem main cylinder 18.

Two brake pipe branches 32 and 33 connect at a branching position 31 of the main brake pipe 14 of the front axle brake circuit I and two brake pipe branches 36 and 37 connect at a branching position 34 of the main brake pipe 16 of the rear axle brake circuit II for feeding brake pressure into the wheel brakes 4 and 6 of the front wheel brake circuit I and to the wheel brakes 7 and 8 of the rear wheel brake circuit II during a "normal" braking action, i.e. one not subject to the anti-lock control. These branch pipes 32/33 and 36/37 lead to inlet valves 38, 39, 41 or 42 respectively which, when the anti-lock system 2 or the drive slip system 3 has not responded, take up their basic through-flow positions in which the wheel brake cylinders of the front wheel brakes 4 and 6 and of the rear wheel brakes 7 and 8 are connected to the main brake pipe 14 or 16 of the respective brake circuit I or II via a through flow path 43 (see rear brake inlet valve 41) of each of these inlet valves 38, 39, 41 and 42. It is possible either to build up, or to reduce, brake pressure by appropriate actuation of the brake unit 9 in the basic through-flow positions of these inlet valves 38, 39, 41 and 42.

These inlet valves 38/39 and 41/42 are designed as 2/2-way solenoid valves which (when their switching solenoids 44 are actuated, individually or severally, depending on which of the vehicle wheel(s) is to be affected by the control, by output signals from an electronic control unit 46 provided for the functional control of both the anti-lock system 2 and the drive slip control 3) can be driven, into their excited shut-off position in which the wheel brake(s) 4 and/or 6 and 7 and/or 8 of the front axle brake circuit I and the rear axle brake circuit II subject for the moment to the electronic control 46 is/are shut off from the particular main brake pipe 14 or 16.

In addition, the wheel brake cylinders of the front and rear wheel brakes 4/6, 7/8 are connected via outlet valves 47/48 and 49/51 respectively to a return pipe 52 of the front axle brake circuit I and a return line 53 of the rear axle brake circuit II, respectively. Low pressure reservoirs 54 and 56 are connected to these circuits. The storage capacities of these reservoirs being equal to about half the brake fluid volumes which have to be drained from the wheel brakes 4 and 6 of the front wheel brake circuit I and from the wheel brake 7 and 8 of the rear axle brake circuit II in order to permit a brake pressure reduction to the lowest possible value even when the maximum possible values of the brake pressures $p^{FA}$ $p^{RA}$ respectively have been connected to the wheel brakes 4/6 and 7/8.

The outlet valves 47/48 and 49/51 are 2/2-way solenoid valves which can be driven, individually or severally, depending on which of the vehicle wheels the drive slip control responds to, by excitation of their respective control magnets 57 by means of a control output signal from the electronic control unit 46, from their basic shut off position, into their excited through flow position in which those wheel brake(s) 4 and/or 6 and 7 and/or 8, subjected to the electronic control 46 is, or are, connected via the through flow path 58 of the particular outlet valve to the return pipes 52/53 of the front and/or rear axle brake circuits I and II so as to produce a reduction of brake pressure.

The pump chambers 59 and 61 of the two return pumps 27 and 28 are connected, via respective inlet non-return valves 62 and 63 to the return pipes 52 and 53 of the front and rear axle brake circuits I and II, respectively. These input non-return valves 62 and 63 subjected in the opening direction to relatively high pressure in their respective return pipes 52 or 53 and the low pressure reservoirs 54 and 56 connected to them, relative to the respective pump chambers 59 and 61, are held in their shut-off position by relatively high pressure in the respective pump chambers 59 and 61 relative to the return pipes 52 and 53. The closing force of the valve springs of these inlet non-return valves 62 and 63 is, in a typical design, equivalent to a pressure of 2–3 bar. Assuming a piston and spring type of design, the low pressure reservoirs 54 and 56 are typically designed in such a way that the preload of their reservoir springs 64 and 65 is equivalent to a somewhat higher reservoir pressure of, for example, 4–6 bar and, if the acceptance capacity of the low pressure reservoir 54 or 56 is fully exploited, it is approximately equivalent to a pressure of 10 bar.

In addition, the pump chambers 59 and 61 of the two return pumps 27 and 28 are connected via respective outlet non-return valves 67 and 68 to the main brake pipes 14 and 16 of the front and rear axle brake circuits I and II. These outlet non-return valves 67 and 68, subjected in the opening direction to a pressure in the respective pump chambers 59 and 61 which is higher relative to that in the connected main brake pipes 14 and 16, are held in the shut-off position by a pressure in the respective main brake pipe 14 or 16 which is higher relative to that in the connected pump chamber 59 or 61.

The outlet non-return valves 67 and 68 are designed in such a way that their closing force is equivalent to a pressure of 2–3 bar.

The elements provided "within" the anti-lock system 2 for the anti-lock control on the rear wheel brakes 7 and 8, i.e., the inlet valves 41 and 42, the outlet valves 49 and 51, the piston pump 28 associated with the rear wheel brake circuit II and the low pressure reservoir 56, are also used for similar purposes as part of the drive slip control 3, which only acts on the rear axle.

The return pump 28 is then used for an additional function as the pressure generating element for the drive slip control. The outlet pressure of this pressure generating element is connected, during a response of the drive slip control, to the wheel brake cylinder(s) of the wheel brakes(s) 7 and/or 8, on which a spin tendency appears.

The section leading from the secondary outlet pressure space 12 to the branching position 34 of the main brake pipe 16 of the rear axle brake circuit II is connected, by means of a drive slip control valve 69 (which is connected between the pressure outlet 71 of the secondary outlet pressure space 12 and a connection position 72 of the main brake pipe 16 at which the outlet side of the outlet non-return valve 68 of the return pump 28 is connected to the main brake pipe 16) can be shut off relative to the outlet pressure space 12 of the tandem main cylinder 18 of the brake device 9.

This drive slip control valve 69 is a 2/2-way solenoid valve whose basic through-flow position connects pressure outlet 71 of the brake device 9 associated with the rear axle brake circuit II to the main brake pipe 16 of the rear axle brake circuit II branching to the wheel brakes 7 and 8.

When the drive slip control system 3 responds, the control magnet 69 of the drive system control valve is switched into its excited shut-off position for the duration of the activation of the drive slip control by means of an output signal from the electronic control unit 46, which is also responsible for actuating the individual control phases of the drive slip control. By this, the brake device 9 is disconnected from the rear axle brake circuit II. An electrically driven booster pump 73 is provided as a further, additional functional element of the drive slip control system 3. The booster pump, is controlled by output signals from the electronic control unit 46 to pump brake fluid from chamber 74, associated with the rear axle brake circuit II of the brake fluid reservoir 76 of the brake installation 1, into the pump chamber 61 of the return pump 28 associated with the rear axle brake circuit II. The pressure outlet 77 of the booster pump 73 being connected via an outlet non-return valve 78 to the inlet side of the inlet non-return valve 63 of the rear axle brake circuit II, the low pressure reservoir 56 of the rear axle brake circuit II and return pipe 53. This outlet non-return valve 78 of the booster pump 73 is subjected in the opening direction to the booster pump's outlet pressure which is higher relative to that in the low pressure reservoir 56 and the return pipe 53 of the rear axle brake circuit II and is otherwise closed, the closing force of this outlet non-return valve 78 being again equivalent to a pressure of 2–4 bar. The outlet pressure and the output of the booster pump 73 are both sufficiently generously dimensioned to ensure that the low pressure reservoir 56 of the rear axle brake circuit II can be completely charged and that the brake fluid flow from the booster pump 73 and the low pressure reservoir 56 to the return pump 28 cannot "separate" while the return pump 28 is operating as the brake pressure source in drive slip control operation.

The outlet pressure level of the booster pump 73 is around 20 bar and is limited to this value by a pressure limiting valve 79, shown as a non-return valve, which is located in a bypass flow path 81 leading back from the outlet 77 of the booster pump 73 to the brake fluid reservoir 76.

The return pump 28 of the rear axle brake circuit II is, like the return pump 27 of the front axle brake circuit I, assumed to be free piston pump, which, in order that this return pump 28 can pump brake fluid into the brake circuit II, assumes a minimum inlet pressure, which is ensured.

Because of a sufficiently powerful drive 29, piston pump 28 can generate an outlet pressure which can be substantially higher than the maximum pressure of 180–200 bar necessary for subjecting the rear wheel brakes 7 and 8 to a correct brake pressure. Hence limitation of the outlet pressure of the return pump 28 of the rear axle brake circuit II is also necessary. For this purpose a pressure limiting valve 82 is inserted in a bypass flow path 83 parallel to the drive slip control valve 69, which bypass flow path 83 leads from the connection position 72 of the main brake pipe 16 to the pressure outlet 71 of the secondary outlet pressure space 12 of the tandem main cylinder 18.

Since, in a driving situation in which the drive slip control 3 responds, the brake installation 1 is not actuated and the secondary floating piston 24 of the main cylinder 18 is in its basic position in which the secondary outlet pressure space 12 communicates with the brake fluid reservoirs 74, 76 either via a central valve of the secondary piston 24 or via a follow-up bore, brake fluid can drain (via the pressure limiting bypass path 82, 83 and via the secondary outlet pressure space 12 into the brake fluid reservoir 76 chamber 74, connected to the pressure space 12) if the outlet pressure of the return pump 28 exceeds the maximum permissible limiting value of, for example, 200 bar.

The anti-lock system 2 and drive slip control 3 operate as follows in their respective control operations, the two types of control being explained by a typical control cycle for each, in which the driven rear wheel of the vehicle represented by the wheel brake 7 on the right is considered and reference is first made to the anti-lock control function.

During a braking operation, the drive slip control valve 69 remains in the basic through-flow position. If a tendency to lock occurs on the right-hand rear wheel during the course of the braking operation, action is first taken against this locking tendency by an initial brake pressure reduction phase. For this purpose, the inlet valve of the wheel brake 7 is switched into its shut-off position and the outlet valve 49 of this wheel brake 7 is switched into its through-flow position. At the same time, or in anticipation somewhat earlier, i.e., as soon as the electronic control unit 46 "recognizes" the appearance of a tendency to lock, the drive 29 of the return pumps 27 and 28 is also switched on. Brake fluid under the brake pressure achieved up to that point flows through the now open outlet valve 49 via the return pipe 53 and, where it is not, partially pumped back directly by the return pump 28 of the rear axle brake circuit II into the outlet pressure space 12 of the brake device 9 associated with the brake circuit II, it is first accepted by the low pressure reservoir 56 of the rear axle brake circuit II and subsequently, in further pumping strokes of the return pump 28, it is completely pumped back into the rear axle outlet pressure space 12 of the brake device 9, 18. The resulting pulsating rearward motion of the brake pedal 13 against the actuation force $K_p$ provides the driver with an obvious signal of the activation of the anti-lock system 2.

As soon as the locking tendency ends due to the pressure reduction phase, the outlet valve 49 is switched back into its closed basic position while the inlet valve 41 still remains in its shut-off position. Because of this, the brake pressure value reached, due to the control operation on the wheel brake 7 previously tending to lock, is initially maintained at wheel brake 7. If the locking tendency then reappears, the outlet valve 49 is again switched into its basic through-flow position while the inlet valve 41 remains closed until, finally, the outlet pressure existing in the outlet pressure space 12 of the brake device 9 is again connected to the full amount of the pressure in rear wheel brake 7 previously tending to lock.

The return pumps 27 and 28 also remain in operation during the phase where the brake pressure is building up again at the conclusion of the anti-lock control cycle; they are only switched off after a certain safety period during which there has been no further tendency to lock.

In the brake circuit not subjected to the control system, in the front axle brake circuit I in the explanatory example chosen, the activation of its return pump 27 has practically no effect because its pumping strokes contribute, at most, only to a pulsation of the brake pedal 13 and therefore to signalling the activation of the anti-lock system, but not to an increase in pressure in the front axle brake circuit I.

Although explained as a control cycle of a single-wheel control, the anti-lock control of the rear axle can, of course, also take place according to the so-called select-low principle in such a way that if a locking tendency appears on one of the two rear wheels, the brake pressure in both wheel brakes 7 and 8 of the rear axle is lowered, retained and increased again in the same manner. This type of control is desirable for optimum dynamic stability of the vehicle in the case of a braking procedure subject to the anti-lock control.

In contrast to this, the drive slip control (drive slip control function) naturally requires, a "single wheel control" in the sense that activation of the wheel brakes 7 or 8 only takes place on that wheel which tends to spin or simultaneous activation of both wheel brakes 7 and 8 only occurs when both vehicle wheels tend to spin. In this latter case, the output torque of the drive unit of the vehicle 1 is then also lowered.

In order to explain a typical control cycle of the drive slip control 3, a starting situation is now assumed in which the drive slip of the right-hand rear wheel begins to increases substantially more than that of the left-hand rear wheel and, in consequence, a situation may soon be expected in which the right-hand rear wheel will spin completely with the result that practically no driving torque can be transmitted to the left-hand rear wheel.

As soon as a lower limiting value of the drive slip of the rear wheel of, for example, 30% is reached or exceeded in this situation, the drive slip $D$ being given by the relationship $D = (v_W - v_V) / v_W$, where the $v_W$ designates the wheel peripheral speed of the vehicle wheel considered, and $v_V$ designates the vehicle speed, or a reference speed representing it approximately and formed from known algorithms; the booster pump 73 and the drive 29 of the return pumps 27 and 28 are switched on in preparation, so to speak; the drive slip control valve 69 is directed into its activated shut-off position simultaneously or somewhat later and, in addition, the inlet valves 41 and 42 of the rear wheel brakes 7 and 8 are also directed into their shut-off positions I. This provides that before brake pressure is connected to the wheel brake 7 of the rear wheel to be subjected, in the immediate future to the control system, a higher pressure is first built up in the part of the brake installation 1 which includes the main brake pipe 16 and the low pressure reservoir 56 of the rear axle brake circuit II and which then acts to some extent like a "supercharged" pressure reservoir from which, as soon as the control system has become effective, brake pressure is connected to the wheel brake 7 by switching back its inlet valve 41 into its basic through-flow position.

As soon as the tendency to spin on the correctly "selected" vehicle wheel has decreased because its wheel brake 7 has been subjected to pressure and because of the resulting retardation of this vehicle wheel, the inlet valve 41 is initially driven back once more into its shut-off position in order to maintain the brake pressure connected to the wheel brake 7 for a limited period. This switching of the inlet valve 41 takes place even before the spin tendency of the wheel considered has completely died away, i.e., even before its drive slip has decreased to beneath a threshold value below which it can again be assumed that a driving torque can again be transmitted to the vehicle to the desired extent via the vehicle wheel subject to the control system and it can be assumed that good driving stability can be ensured at the same time.

If, despite the brake pressure then occurring in the wheel brake 7 and maintained by shutting it off from the main brake pipe 16 by inlet valve 41 being in its shut-off position, the spin tendency of the vehicle wheel subject to the control system again increases, the inlet valve 41 of this wheel brake 7 is again switched back into its through-flow position and the brake pressure in the wheel brake cylinder of the wheel brake 7 is thus increased.

If, after this, the tendency to spin of the vehicle wheel subject to the control system finally dies away, which the electronic control unit 46 of the anti-lock system 2 and the drive slip control 3 recognizes from the fact that the drive slip $\lambda_D$ of the vehicle wheel considered becomes less than a lower limiting value, which is compatible with both good driving stability and adequate drive torque transmission capability, the drive 29 of the return pumps 27 and 28 and the booster pump 73 are initially switched off and the drive slip control valve 69 switched back to its basic through-flow position. Subsequently, after a minimum period $t_{min}$ has elapsed, the inlet valve 41 of the wheel brake 7 is switched back into its basic through-flow position after which the "neutral control" operating condition of the brake installation 1, overall, is again achieved.

The control signals necessary for the correct control, with respect to anti-lock and drive slip control operation, of the inlet valves 38, 39, 41 and 42, the outlet valves 47, 48, 49 and 51, the return pump drive 29, the drive slip control valve 69 and the booster pumP 73, are obtained from the electronic control unit 46 provided in common for both control systems, according to known criteria, of output signals of wheel speed sensors 84/86 and 87/88 which are associated individually with the non-driven and the driven vehicle wheels and which generate output signal characteristic of the wheel peripheral speeds of the individual vehicle wheels, the changes with time of which output signals also containing the information on the acceleration or retardation behavior of the individual vehicle wheels.

It is assumed that it is possible for one skilled with the usual control algorithms of an anti-lock control system and a drive slip control system, on this basis to produce an electronic control unit 46 which, as a function of threshold values of the brake slip or drive slip and/or of the wheel peripheral retardations or accelerations, to provide correct control of the functional elements of the anti-lock system 2 and the drive slip control 3 described above so that a detailed explanation of the electronic control unit 46 which goes into the details of the electronic circuit technology is unnecessary.

In a further, special and preferred embodiment of the drive slip control device 3, a drive slip control outlet valve 89 is provided. This valve 89 is connected between the return pipe 53 of the rear axle brake circuit II and the chamber 74, of the brake fluid reservoir 76 of the brake installation 1.

This drive slip control valve 89 is designed as a 2/2-way solenoid valve which when in its basic shut-off position shuts off the return pipe 53 of the rear axle brake circuit II from the brake fluid reservoir 76, and when in its excited through-flow position provides communication between return pipe 53 and the brake fluid reservoir 76. This outlet valve 89 is used for controlling pressure reduction phases of the drive slip control, i.e. in a function which could also be achieved by switching the drive slip control valve 69 into its basic through-flow position in which case the pressure reduction would have to take place via the compensating flow path of the main cylinder 18 associated with the rear axle brake circuit II. In this case, however, the provision of a special design for the main cylinder 18 would be unavoidable, this having, in particular, the effect that a central valve (not shown) of the secondary piston 24 would require an especially wear-resistant design, such as a ball valve with metallic sealing surfaces. Such a valve would be held in its open position in the basic position of the piston 24, in which it frees a compensating flow path leading from the secondary outlet pressure space 12 of the main cylinder 18 to its brake fluid reservoir 76, and after a small initial section of the pressure build-up stroke of the secondary piston 24 reaches its closed position which has to be reached before the pressure build-up stroke of the secondary piston 24 reaches its closed position (which has to be reached before the pressure build-up in the secondary outlet pressure space 12 of the main cylinder 18 occurs). Such a design of this type of central valve would be necessary so that the latter cannot be damaged due to the "pressure shocks" in the secondary outlet pressure space 12 of the main cylinder 18 associated with pressure reduction phases of the drive slip control.

If pressure reduction phases of the drive slip control, as described above, are controlled by means of the separate drive slip control outlet valve 89, a main cylinder 18 of conventional type can be used as part of the brake device 9 of he brake installation 1. Here the main cylinder 18 compensating flow path can lead via a so-called snifter hole 91 or via a central valve designed in conventional manner as a disk valve, whose valve body is provided with a flexible rubber seal.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Drive slip control device for road vehicle having driven and non-driven wheels, wheel brakes and a hydraulic twin-circuit brake installation with front axle and rear axle brake circuit subdivisions and wherein one of the brake circuit subdivisions is associated with the non-driven vehicle wheels and the other is associated with the driven vehicle wheels;

said brake circuit subdivisions having static brake circuits whose brake pressure supply is achieved by a brake device having two outlet pressure spaces, one associated with each brake circuit subdivision;

an anti-lock braking system operating on the pump-back principle, comprising:

brake pressure control valve means associated individually with each of the driven and non-driven vehicle wheels;

two return pump means associated, one each, with the two brake circuit subdivisions;

said return pump means during pressure reduction phases of the anti-lock control, pumping brake fluid out of the wheel brake(s) then subjected to anti-lock control into output pressure spaces of the brake device with a pressure space being associated with a particular brake circuit subdivision;

said return pump means of the brake circuit of the driven vehicle wheels being used as a pressure source in brake pressure build-up phases of the drive slip control;

a drive slip two-way two position control valve means for connecting the return pump means to the pressure space of the brake device supplying pressure to the brake circuit subdivision of the driven vehicle wheels;

said drive slip control valve means being driven in response to a drive slip control signal from an electronic control unit means controlling the control phases of the drive slip control, from a basic position associated with the normal brake operation and anti-lock control operation into an excited functional position;

the basic position of the drive slip control valve means connects the output pressure space of the brake device associated with the brake circuit subdivision of the driven vehicle wheels to a main brake pipe of the brake circuit subdivision of the driven wheels;

the excited functional position of the drive slip control valve means shutting off this output pressure space from this main brake pipe while this main pipe continues to be connected to the pressure output of the associated return pump means;

the return pump means of the brake circuit of the driven vehicle wheels providing pressure to the brake circuit subdivision of the driven vehicle means in response to a brake pressure build-up control signal from the electronic control unit means;

a pressure limiting valve means being provided to limit the pressure connected to the brake circuit subdivision of the driven vehicle wheels during drive slip control operation wherein excess brake fluid flows out of the brake circuit subdivision of the driven vehicle wheels to a brake circuit subdivision of the driven vehicle wheels to a brake fluid reservoir of the brake installation when output pressure of the return pump means exceeds a specified threshold value;

said electronic control unit means generating first output signal for driving the drive slip control valve means into its excited position;

a second output signal for causing activation of the return pump means of the brake circuit subdivision of the driven vehicle wheels; and further output signals by means of which the brake pressure control valve means of the wheel brakes of the driven vehicle wheels are driven into their shut-off position as soon as the drive slip of at least one of the driven vehicle wheels reaches or exceeds a specified threshold value, whose magnitude is between a required slip value and a response threshold value of the drive slip control; and wherein as soon as the return pump means of the brake circuit of the drive wheels is activated, the return pump means of the brake circuit of the drive wheels pumps brake fluid from the brake fluid reservoir into the main brake pipe of the brake circuit subdivision of the driven vehicle wheels.

2. Drive slip control device according to claim 1, wherein the electronic control unit means generates the first output signal for controlling the drive slip control valve means, the second output signal for causing the activation of the return pump and the further output signals driving the brake pressure control valves into their shut-off position as soon as the wheel peripheral acceleration of at least one of the the driven vehicle wheels exceeds a response threshold value.

3. Drive slip control device according to claim 1, wherein the second output signal of the electronic control unit means providing the activation of the pump drive of the return pump means of the brake circuit subdivision of the driven vehicle wheels is generated as soon as the drive slip of at least one of the driven vehicle wheels at least reaches or exceeds one of: a specified threshold value which is between 50% and 70% of the threshold value at which the drive slip control valve means and the brake pressure control valves means of the wheel brakes of the driven vehicle wheels are moved into their shut-off position; a wheel peripheral acceleration of at least one of the driven vehicle wheels exceeds a response threshold value; and wheel peripheral acceleration greater than the vehicle acceleration by a specified difference which is related to the speed of the vehicle.

4. Drive slip control device according to claim 2, wherein the second output signal of the electronic control unit means providing the activation of the pump drive of the return pump means of the brake circuit subdivision of the driven vehicle wheels is generated as soon as the drive slip of at least one of the driven vehicle wheels at least reaches or exceeds one of: a specified threshold value which is between 50% and 70% of the threshold value at which the drive slip control valve means and the brake pressure control valves means of the wheel brakes of the driven vehicle wheels are moved into their shut-off position; a wheel peripheral acceleration of at least one of the driven vehicle wheels exceeds a response threshold value; and wheel peripheral acceleration greater than the vehicle acceleration by a specified difference which is related to the speed of the vehicle.

5. Drive slip control device according to claim 1, wherein the drive slip two-way two positions control valve means is a 2/2-way solenoid valve which is connected between the brake device pressure output associated with the brake circuit subdivision of the driven vehicle wheels and a section of the main brake pipe branching to the wheel brakes of the driven vehicle wheels and wherein the section of the main brake pipe branching to the wheel brakes of the driven vehicle wheels and pressure limiting valve means are connected in parallel with the drive slip control valve means.

6. Drive slip control device according to claim 2, wherein the drive slip two-way two position control valve means is a 2/2-way solenoid valve which is connected between the brake device pressure output associated with the brake circuit subdivision of the driven vehicle wheels and a section of the main brake pipe branching to the wheel brakes of the driven vehicle wheels and wherein the section of the main brake pipe branching to the wheel brakes of the driven vehicle wheels and pressure limiting valve means are connected in parallel with the drive slip control valve means.

7. Drive slip control device according to claim 3, wherein the drive slip two-way two position control valve means is a 2/2-way solenoid valve which is connected between the brake device pressure output associated with the brake circuit subdivision of the driven vehicle wheels and a section of the main brake pipe branching to the wheel brakes of the driven vehicle wheels and wherein the section of the main brake pipe branching to the wheel brakes of the driven vehicle wheels and pressure limiting valve means are connected in parallel with the drive slip control valve means.

8. Drive slip control device according to claim 4, wherein the drive slip two-way two position control valve means is a 2/2-way solenoid valve which is connected between the brake device pressure output associated with the brake circuit subdivision of the driven vehicle wheels and a section of the main brake pipe branching to the wheel brakes of the driven vehicle wheels and wherein the section of the main brake pipe branching to the wheel brakes of the driven vehicle wheels and pressure limiting valve means are connected in parallel with the drive slip control valve means.

9. Drive slip control device according to claim 1, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

10. Drive slip control device according to claim 2, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

11. Drive slip control device according to claim 3, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

12. Drive slip control device according to claim 4, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

13. Drive slip control device according to claim 5, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

14. Drive slip control device according to claim 6, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

15. Drive slip control device according to claim 7, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

16. Drive slip control device according to claim 8, wherein a solenoid slip control outlet valve means is provided as a further drive slip functional control valve by means of which the return pipe of the brake circuit subdivision of the driven vehicle wheels is directly connected to the brake fluid reservoirs of the brake installation during the pressure reduction phases of the drive slip control.

17. Drive slip control device according to claim 2, wherein the response threshold value is proportional to a vehicle speed responsive function of vehicle acceleration.

18. Drive slip control device according to claim 4, wherein the response threshold value is proportional to a vehicle speed responsive function of vehicle acceleration.

19. Drive slip control device according to claim 6, wherein the response threshold value is proportional to a vehicle speed responsive function of vehicle acceleration.

20. Drive slip control device according to claim 10, wherein the response threshold value is proportional to a vehicle speed responsive function of vehicle acceleration.

* * * * *